United States Patent
Francois et al.

(10) Patent No.: US 11,240,504 B2
(45) Date of Patent: Feb. 1, 2022

(54) ENCODING AND DECODING PICTURES IN OF HIGH DYNAMIC RANGE AND WIDE COLOR GAMUT FORMAT

(71) Applicant: InterDigital Madison Patent Holdings, SAS, Paris (FR)

(72) Inventors: Edouard Francois, Cesson-Sevigne (FR); Christophe Chevance, Cesson-Sevigne (FR); Franck Hiron, Cesson-Sevigne (FR)

(73) Assignee: InterDigital Madison Patent Holdings, SAS, Paris (FR)

(*) Notice: Subject to any disclaimer, the term of this patent is extended or adjusted under 35 U.S.C. 154(b) by 0 days.

(21) Appl. No.: 16/628,676

(22) PCT Filed: Jul. 2, 2018

(86) PCT No.: PCT/EP2018/067847
§ 371 (c)(1),
(2) Date: Jan. 5, 2020

(87) PCT Pub. No.: WO2019/007917
PCT Pub. Date: Jan. 10, 2019

(65) Prior Publication Data
US 2020/0221092 A1    Jul. 9, 2020

(30) Foreign Application Priority Data
Jul. 6, 2017 (EP) .................... 17305884

(51) Int. Cl.
*H04N 19/126* (2014.01)
*H04N 19/176* (2014.01)
*H04N 19/186* (2014.01)

(52) U.S. Cl.
CPC ......... *H04N 19/126* (2014.11); *H04N 19/176* (2014.11); *H04N 19/186* (2014.11)

(58) Field of Classification Search
CPC ... H04N 19/176; H04N 19/186; H04N 19/126
See application file for complete search history.

(56) References Cited

U.S. PATENT DOCUMENTS

| 8,582,646 B2 | 11/2013 | Liu et al. |
| 9,510,002 B2 | 11/2016 | Tourapis et al. |

(Continued)

FOREIGN PATENT DOCUMENTS

| EP | 2672707 A1 | 12/2013 |
| EP | 3089453 A1 | 11/2016 |
| WO | WO 2017093188 A1 | 6/2017 |

OTHER PUBLICATIONS

Samuelsson et al., "Conversion and Coding Practices for HDR/WCG Y'CbCr 4:2:0 Video with PQ Transfer Characteristics (Draft 4)", Joint Collaborative Team on Video Coding (JCT-VC) of ITU-T SG16 WP 3 and ISO/IEC JTC 1/SC 29/WG 11, Document JCTVC-Z1017, 26th Meeting, Geneva, Switzerland, Jan. 12, 2017, 30 pages.

(Continued)

*Primary Examiner* — Zhubing Ren
(74) *Attorney, Agent, or Firm* — Condo Roccia Koptiw LLP

(57) ABSTRACT

A method for decoding a block of a picture represented in a current HDR/WCG format is disclosed. The method comprises receiving a bitstream representative of a coded block of picture, an indication representative of a default d QP table (index_d QP_table), an indication representative of a QP offset (slice_qp_delta); determining a quantization parameter responsive to the current format based on the default d QP table and the QP offset; decoding the coded block of a picture using the determined QP. Corresponding encoding method, transmitting method, decoding device, encoding device and transmitting device are disclosed. Besides an embodiment relative to adapting generic codec (Continued)

parameters to any HDR/WCG format as done for d QP table is also disclosed.

11 Claims, 10 Drawing Sheets

(56) References Cited

U.S. PATENT DOCUMENTS

| | | | |
|---|---|---|---|
| 9,521,410 B2 | 12/2016 | Seregin et al. | |
| 9,591,302 B2 | 3/2017 | Sullivan | |
| 2004/0013202 A1 | 1/2004 | Lainema | |
| 2008/0175496 A1 | 7/2008 | Segall | |
| 2014/0376621 A1 | 12/2014 | Fukushima et al. | |
| 2015/0358631 A1* | 12/2015 | Zhang | H04N 19/159 375/240.16 |
| 2016/0057419 A1* | 2/2016 | Francois | H04N 19/124 375/240.03 |
| 2016/0316207 A1 | 10/2016 | Minoo et al. | |
| 2016/0373745 A1 | 12/2016 | Joshi et al. | |
| 2017/0332098 A1* | 11/2017 | Rusanovskyy | H04N 19/18 |
| 2017/0345187 A1* | 11/2017 | Sato | G09G 3/3413 |
| 2018/0376143 A1* | 12/2018 | Andersson | H04N 19/196 |

OTHER PUBLICATIONS

Anonymous, "High dynamic range television for production and international programme exchange", International Telecommunication Union, ITU-R Radiocommunication Sector of ITU, Recommendation ITU-R BT.2390-0, 2016, pp. 1-40.

Francois et al., "Signalling, Backward Compatibility and Display Adaptation for HDR/WCG Video Coding (Draft 2)", Joint Collaborative Team on Video Coding (JCT-VC) of ITU-T SG16 WP 3 and ISO/IEC JTC 1/SC 29/WG 11, Document JCTVC-Z1012, 26th Meeting, Geneva, Switzerland, Jan. 12, 2017, 32 pages.

Anonymous, "Image parameters values for high dynamic range television systems for use in production and international programme exchange", International Telecommunication Union, ITU-R Radiocommunication Sector of ITU, Recommendation ITU-R BT.2100-0, Jul. 2016, pp. 1-17.

Iwamura et al., "AHG7: On the need of luma delta QP for BT.2100 HLG content", Joint Video Exploration Team (JVET) of ITU-T SG 16 WP 3 and ISO/IEC JTC 1/SC 29/WG 11, Document JVET-G0059, 7th Meeting, Torino, Italy, Jul. 13, 2017, 13 pages.

* cited by examiner

ENCODING AND DECODING PICTURES IN OF HIGH DYNAMIC RANGE AND WIDE COLOR GAMUT FORMAT

This application claims the benefit, under 35 U.S.C. § 365 of International Application PCT/EP2018/067847, filed Jul. 2, 2018, which was published in accordance with PCT Article 21(2) on Jan. 10, 2019, in English, and which claims the benefit of European Patent Application No. 17305884.3, filed Jul. 6, 2017.

1. TECHNICAL FIELD

The present principles generally relate to a method and a device for picture encoding, and more particularly, to a method and a device for encoding a block of a picture of high dynamic range and wide color gamut.

2. BACKGROUND ART

New generation video formats include wider color gamut, higher frame rate, and higher dynamic range. New standards have been created to support this type of content from capture, through encoding, distribution and up to end user rendering. A transfer function (TF) is used to convert an optical representation of a signal (linear light value) at capture into an integer format compatible with image processing such as encoding. An electro-optical TF (EOTF) converts non-linear values into linear-light values, and the opto-electronic TF (OETF) converts linear-light values into non-linear values for display. For example, ITU-R Recommendation BT.2100 defines two sets of transfer functions namely Perceptual Quantizer (PQ) and Hybrid-Log Gamma (HLG). HLG is a relative transfer function (the OETF applies to normalized linear-light values, and the normalization depends on the actual peak luminance considered for the mastering display or camera). Rec. ITU-R BT.2100 also specifies color primaries for HDR, which actually correspond to the BT.2020 color primaries. To summarize, BT.2100 specifies the format of HDR video signals, that are represented in BT.2020 color primaries, with two possible transfer functions, PQ and HLG.

Besides, it is known that many current HDR content are represented in a PQ Y'CbCr 4:2:0 10-bits format. Therefore, many efforts are being made to optimally encode such signal, for instance using HEVC encoders. Technical Report ISO/IEC 23008-14 (2017), "Conversion and Coding Practices for HDR/WCG Y'CbCr 4:2:0 Video with PQ Transfer Characteristics" discloses solutions for optimal encoding based dedicated codec parameters responsive to luma-dependent local QP adaptation, to signal remapping prior to encoding, and to residual signal remapping inside the encoding process. Typically, the codec parameters are implemented as indexable tables in the encoder or decoder.

However, no specific solution to encode current HDR content represented with an HLG transfer function has been developed. One noticeable difficulty with HLG is that, contrarily to PQ, it is a relative transfer function wherein statistic distribution of different HLG signals may differ noticeably depending if they are natively scene-referred or display-referred, or depending on the peak luminance of the native linear-light signal. It is therefore required to be able to handle these different cases in the HLG coding/decoding process. Therefore, as many sets of codec parameters as different cases HLG are expected for optimally encoding current HDR content represented with an HLG transfer function. It is desirable to optimize the implementation of codec parameters for conversion and coding for HDR/WCG Y'CbCr 4:2:0 Video with HLG Transfer function or any other HDR/WCG representation format. More specifically, an implementation reducing the complexity and memory needs, especially at decoder side, and improving the coding efficiency is desirable.

3. BRIEF SUMMARY

A method for encoding a block of a picture represented in a current format (for instance defined for a PQ or an HLG transfer function, a color gamut and a peak luminance) is disclosed that comprises for at least one sample of the block and for one current component determining a quantization parameter QP responsive to the current format for encoding the block of picture with respect to a default dQP table and a QP offset, the determining using an indication representative of a default dQP table (index_dQP_table) and an indication representative of a QP offset (slice_qp_delta); and encoding the at least one sample of the block into a bitstream using the determined quantization parameter QP.

Advantageously, the disclosed method drastically reduces the set of codec parameters or tables (implemented as QP tables, scaling tables or mapping tables), whatever the PQ or HLG signal characteristics, which advantageously results in a reduction of the required tuning for the encoder and memory needs at encoder and decoder.

A device for encoding a block of a picture represented in a current format comprising means for determining a quantization parameter QP responsive to a current format for encoding the block of picture with respect to a default dQP table and a QP offset, wherein the quantization parameter QP is determined using an indication representative of a default dQP table (index_dQP_table) and an indication representative of a QP offset (slice_qp_delta); and means for encoding the at least one sample of the block of into a bitstream using the determined quantization parameter QP.

In variant, an encoding device is disclosed that comprises a communication interface configured to access a block of a picture represented in a current format and at least one processor configured to:
  determine a quantization parameter QP responsive to the current format for encoding the block of picture with respect to a default dQP table and a QP offset, wherein the quantization parameter QP is determined using an indication representative of a default dQP table (index_dQP_table) and an indication representative of a QP offset (slice_qp_delta);
  encoding the at least one sample of the accessed block into a bitstream using the determined quantization parameter QP. That is a transform coefficient for the at least one sample of the accessed block is quantized using the determined quantization parameter QP.

A bitstream representative of a block of a picture represented in a current format is disclosed that comprises:
  coded data representative of the block of a picture wherein the block is coded into a bitstream using a determined quantization parameter QP responsive to current format and;
  coded data representative of an indication of a default dQP table (index_dQP_table) and an indication of a QP offset (slice_qp_delta) responsive to the current format.

In a variant, a non-transitory processor readable medium having stored thereon a bitstream representative of a block of a picture represented in a current format is disclosed, wherein the bitstream comprises:

coded data representative of the block of picture wherein the block is coded into a bitstream using a determined quantization parameter QP responsive to current format and;

coded data representative of an indication of a default dQP table (index_dQP_table) and an indication of a QP offset (slice_qp_delta) responsive to the current format.

A transmitting method is disclosed that comprises:

transmitting coded data representative of a block of a picture represented in a current format wherein the block is coded into a bitstream using a determined quantization parameter QP responsive to current format and;

transmitting coded data representative of an indication of a default dQP table (index_dQP_table) and an indication of a QP offset (slice_qp_delta).

A transmitting device is disclosed that comprises:

means for transmitting coded data representative of a block of a picture represented in a current format wherein the block is coded into a bitstream using a determined quantization parameter QP responsive to current format and;

means for transmitting coded data representative of an indication of a default dQP table (index_dQP_table) and an indication of a QP offset (slice_qp_delta).

In a variant, a transmitting device is disclosed that comprises a communication interface configured to access a block of a picture and at least one processor configured to:

transmit coded data representative of the accessed block of a picture represented in a current format wherein the accessed block is coded into a bitstream using a determined quantization parameter QP responsive to current format and;

transmit coded data representative of an indication of a default dQP table (index_dQP_table) and an indication of a QP offset (slice_qp_delta).

Advantageously, a signaling for indicating which table (or function) among the default ones that are pre-defined, is actually used for the current format of the picture to encode is advantageously disclosed. The signaling may be implicit (the indication is deduced from information on the current format) or explicit (the indication is explicitly coded in the bitstream).

The following embodiments apply to the encoding method, encoding devices, bitstream, processor readable medium, transmitting method and transmitting devices disclosed above.

In a first specific and non-limiting embodiment, the indication representative of a default dQP table (index_dQP_table) and the indication representative of a QP offset (slice_qp_delta) are explicitly encoded into the bitstream.

In a second specific and non-limiting embodiment, the indication representative of a default dQP table (index_dQP_table) is implicitly encoded into the bitstream with VUI information.

In a third specific and non-limiting embodiment, the quantization parameter QP is determined for luma component only.

In a fourth specific and non-limiting embodiment, wherein a format of the video signal data is defined by a color gamut, transfer function and a peak luminance.

A method for decoding a block of a picture represented in a current format is disclosed that comprises:

receiving a bitstream representative of a coded block of picture, an indication representative of a default dQP table (index_dQP_table), an indication representative of a QP offset (slice_qp_delta);

determining a quantization parameter responsive to the current format based on the default dQP table and the QP offset;

decoding the coded block of a picture using the determined QP.

A device for decoding a block of a picture represented in a current format is disclosed that comprises:

means for receiving a bitstream representative of a coded block of picture, an indication representative of a default dQP table (index_dQP_table), an indication representative of a QP offset (slice_qp_delta);

means for determining a quantization parameter OP responsive to the current format based on the indicated default dQP table and the indicated QP offset;

means for decoding the coded block of picture using the determined quantization parameter QP.

In a variant, a decoding device is disclosed that comprises a communication interface configured to access a bitstream and at least one processor configured to:

receive a bitstream representative of a coded block of picture, an indication representative of a default dQP table (index_dQP_table), an indication representative of a QP offset (slice_qp_delta);

determine a quantization parameter QP responsive to the current format based on the indicated default dQP table and the indicated QP offset;

decode the coded block of picture using the determined quantization parameter QP.

Advantageously, a normative implementation in the decoder of the reduced number of dQP tables, covering both PQ and HLG signal representations, results in a reduction of the memory needs for the decoder, and enables to improve coding efficiency to code PQ and HLG content.

According to another aspect, a method for encoding a block of a picture represented in a current format is disclosed that comprises, for at least one sample of the block and for luma and chroma components:

determining a scaling function responsive to the current format for encoding the block of picture, the scaling function being applied for deriving the mapping of the luma component and for scaling the chroma components;

encoding the block of picture using the derived mapping function applied to the luma component and the determined scaling function applied to the chroma components.

A method for decoding a coded block of a picture represented in a current format is disclosed that comprise:

receiving a bitstream representative of a coded block of picture;

determining an inverse scaling function responsive to the current format for decoding the coded block of picture, the inverse scaling function being applied for deriving an inverse mapping of the luma component and for scaling the chroma components;

decoding the coded block of picture using the derived inverse mapping function applied to the luma component and the determined inverse scaling function applied to the chroma components.

4. BRIEF SUMMARY OF THE DRAWINGS

5. DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

A picture is an array of samples. A picture is an array of luma components in monochrome format or an array of luma components and two corresponding arrays of chroma components in 4:2:0, 4:2:2, and 4:4:4 colour format. Generally, a "block" addresses a specific area in a sample array (e.g., luma Y), and a "unit" includes the collocated block of all color components (luma Y and possibly chroma Cb and chroma Cr). A slice is an integer number of basic coding units such as HEVC coding tree units or H.264 macroblock units. A slice may consist of a complete picture as well as part thereof. Each slice may include one or more slice segments.

In the following, the word "reconstructed" and "decoded" can be used interchangeably. Usually but not necessarily "reconstructed" is used on the encoder side while "decoded" is used on the decoder side. It should be noted that the term "decoded" or "reconstructed" may mean that a bitstream is partially "decoded" or "reconstructed," for example, the signals obtained after deblocking filtering but before SAO filtering, and the reconstructed samples may be different from the final decoded output that is used for display. We may also use the terms "image," "picture," and "frame" interchangeably. We may also use the terms "sample," and "pixel" interchangeably.

Various embodiments are described with respect to the HEVC standard. However, the present principles are not limited to HEVC, and can be applied to other standards, recommendations, and extensions thereof, including for example HEVC or HEVC extensions like Format Range (RExt), Scalability (SHVC), Multi-View (MV-HEVC) Extensions and H.266. The various embodiments are described with respect to the encoding/decoding of a slice. They may be applied to encode/decode a whole picture or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

Figure 1:
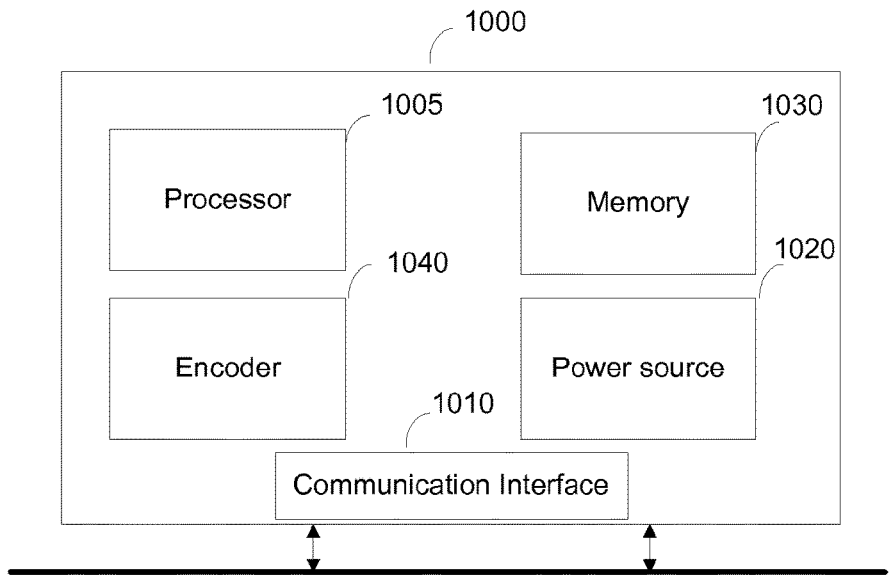
FIG. 1 represents an exemplary architecture of a transmitter configured to encode a picture in a bitstream according to a specific and non-limiting embodiment.

FIG. 1 represents an exemplary architecture of a transmitter 1000 configured to encode a picture in a bitstream according to a specific and non-limiting embodiment.

The transmitter 1000 comprises one or more processor(s) 1005, which could comprise, for example, a CPU, a GPU and/or a DSP (English acronym of Digital Signal Processor), along with internal memory 1030 (e.g. RAM, ROM, and/or EPROM). The transmitter 1000 comprises one or more communication interface(s) 1010 (e.g. a keyboard, a mouse, a touchpad, a webcam), each adapted to display output information and/or allow a user to enter commands and/or data; and a power source 1020 which may be external to the transmitter 1000. The transmitter 1000 may also comprise one or more network interface(s) (not shown). Encoder module 1040 represents the module that may be included in a device to perform the coding functions. Additionally, encoder module 1040 may be implemented as a separate element of the transmitter 1000 or may be incorporated within processor(s) 1005 as a combination of hardware and software as known to those skilled in the art.

The picture may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 1000 further comprises a computer program stored in the memory 1030. The computer program comprises instructions which, when executed by the transmitter 1000, in particular by the processor 1005, enable the transmitter 1000 to execute the encoding method described with reference to FIG. 5A. According to a variant, the computer program is stored externally to the transmitter 1000 on a non-transitory digital data support, e.g. on an external storage medium such as a HDD, CD-ROM, DVD, a read-only and/or DVD drive and/or a DVD Read/Write drive, all known in the art. The transmitter 1000 thus comprises a mechanism to read the computer program. Further, the transmitter 1000 could access one or more Universal Serial Bus (USB)-type storage devices (e.g., "memory sticks.") through corresponding USB ports (not shown). According to exemplary and non-limiting embodiments, the transmitter 1000 can be, but is not limited to:

- a mobile device;
- a communication device;
- a game device;
- a tablet (or tablet computer);
- a laptop;
- a still picture camera;
- a video camera;
- an encoding chip or encoding device/apparatus;
- a still picture server; and
- a video server (e.g. a broadcast server, a video-on-demand server or a web server).

Figure 2:
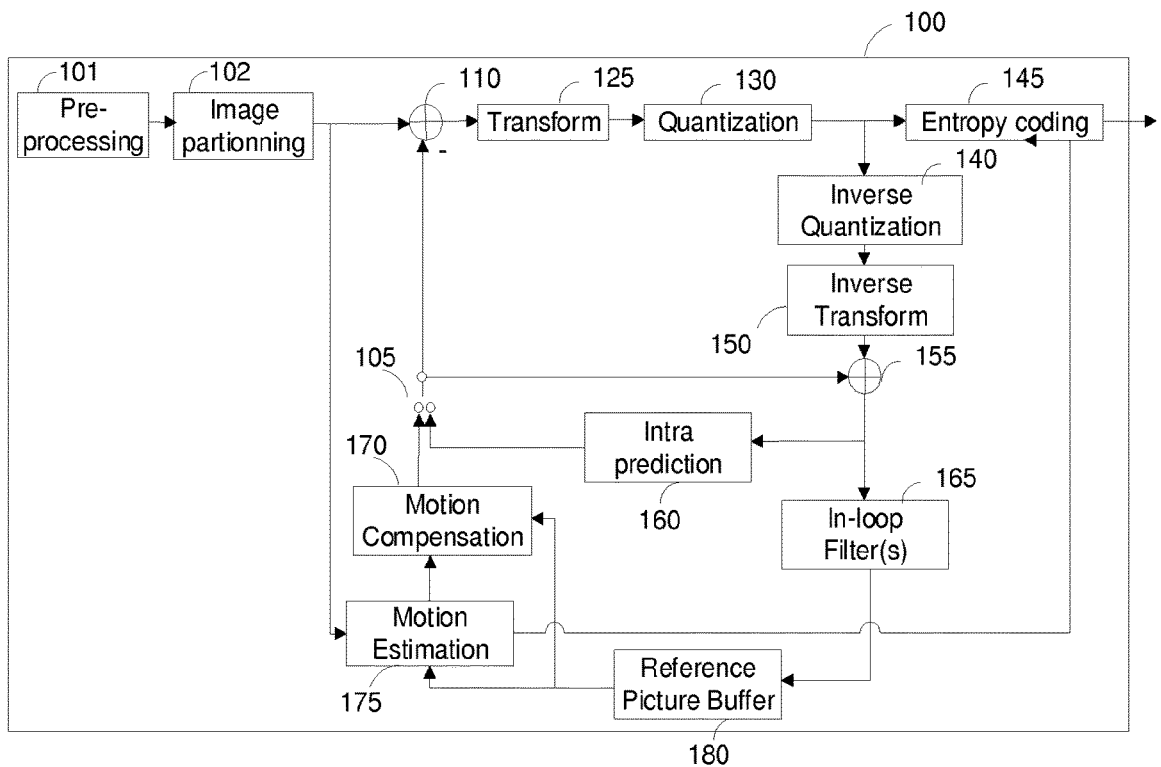
FIG. 2 illustrates an exemplary video encoder, e.g. a HEVC video encoder, adapted to execute the encoding method according to the present principles.
Figure 5A:
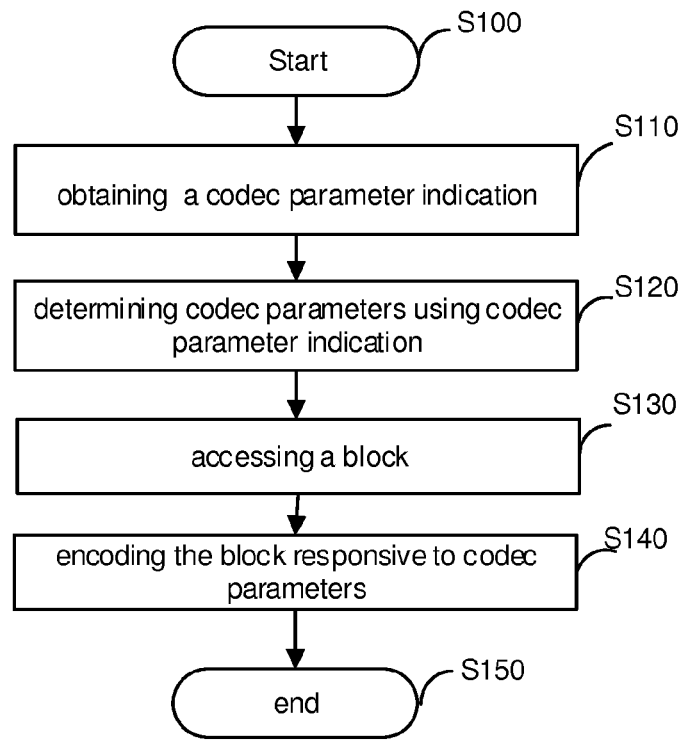
FIG. 5A represents a flowchart of a method for encoding a picture block in a bitstream according to according to a specific and non-limiting embodiment.

FIG. 2 illustrates an exemplary video encoder 100, e.g. a HEVC video encoder, adapted to execute the encoding method according to the embodiment of FIG. 5A. The encoder 100 is an example of a transmitter 1000 or part of such a transmitter 1000.

For coding an HDR/WCG picture, the HDR/WCG picture is pre-processed to convert a 4:4:4 RGB linear light BT.2020 representation into a YCrCb 4:2:0 representation using a transfer function for example of type Perceptual Quantizer (PQ) or HLG (Hybrid-Log Gamma). Then, for coding, a picture is usually partitioned into basic coding units, e.g. into coding tree units (CTU) in HEVC or into macroblock units in H.264. A set of possibly consecutive basic coding units is grouped into a slice. A basic coding unit contains the basic coding blocks of all color components. In HEVC, the smallest CTB size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock) in other standards such as H.264.

In HEVC, a CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of various sizes.

In the exemplary encoder 100, a picture is encoded by the encoder elements as described below. The picture to be encoded is converted (101) into a representation format compatible with the encoder, for example into a YCrCb 4:2:0 representation using the transfer function HLG (Hybrid-Log Gamma). The picture in a representation format is processed (102) in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Residuals are calculated by subtracting (110) a predicted sample block (also known as a predictor) from the original picture block. The prediction sample block comprises prediction values, one for each sample of the block.

CUs in intra mode are predicted from reconstructed neighboring samples within the same slice. A set of 35 intra prediction modes is available in HEVC, including a DC, a planar and 33 angular prediction modes. The intra prediction reference is reconstructed from the row and column adjacent to the current block. The reference extends over two times the block size in horizontal and vertical direction using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed.

The motion information (i.e., motion vector and reference index) can be signaled in two methods, namely, "advanced motion vector prediction (AMVP)" and "merge mode". In AMVP, a video encoder or decoder assembles candidate lists based on motion vectors determined from already coded blocks. The video encoder then signals an index into the candidate lists to identify a motion vector predictor (MVP) and signals a motion vector difference (MVD). At the decoder side, the motion vector (MV) is reconstructed as MVP+MVD.

In the merge mode, a video encoder or decoder assembles a candidate list based on already coded blocks, and the video encoder signals an index for one of the candidates in the candidate list. At the decoder side, the motion vector and the reference picture index are reconstructed based on the signaled candidate.

In HEVC, the precision of the motion information for motion compensation is one quarter-sample for the luma component and one eighth-sample for the chroma components. A 7-tap or 8-tap interpolation filter is used for interpolation of fractional-sample sample positions, i.e., ¼, ½ and ¾ of full sample locations in both horizontal and vertical directions can be addressed for luma.

The residuals are transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder comprises a decoding loop and thus decodes an encoded block to provide a reference for further predictions. The quantized transform coefficients are de-quantized (140) and inverse transformed (150) to decode residuals. A picture block is reconstructed by combining (155) the decoded residuals and the predicted sample block. An in-loop filter (165) is applied to the reconstructed picture, for example, to perform deblocking/SAO (Sample Adaptive Offset) filtering to reduce coding artifacts. The filtered picture may be stored in a reference picture buffer (180) and used as reference for other pictures.

In HEVC, SAO filtering may be activated or de-activated at video level, slice level and CTB level. Two SAO modes are specified: edge offset (EO) and band offset (BO). For EO, the sample classification is based on local directional structures in the picture to be filtered. For BO, the sample classification is based on sample values. The parameters for EO or BO may be explicitly coded or derived from the neighborhood. SAO can be applied to the luma and chroma components, where the SAO mode is the same for Cb and Cr components. The SAO parameters (i.e. the offsets, the SAO types EO, BO and inactivated, the class in case of EO and the band position in case of BO) are configured individually for each color component.

Figure 3:
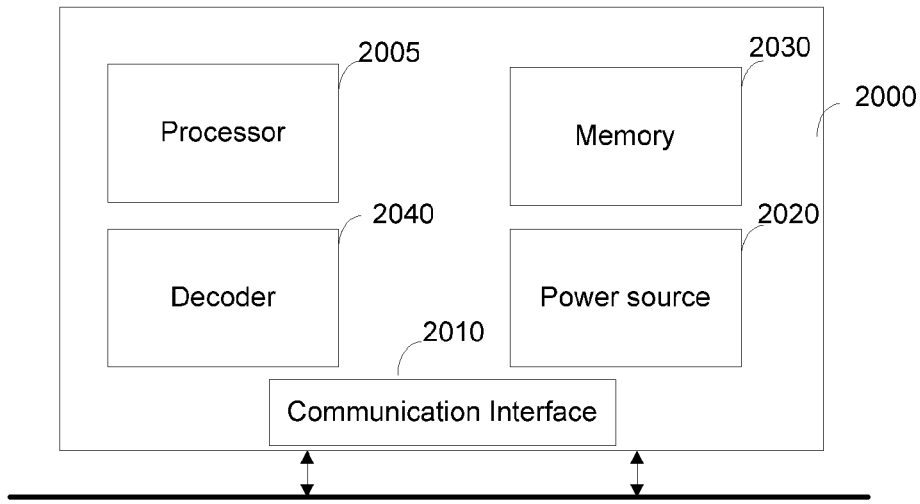
FIG. 3 represents an exemplary architecture of a receiver configured to decode a picture from a bitstream to obtain a decoded picture according to a specific and non-limiting embodiment.

FIG. 3 represents an exemplary architecture of a receiver 2000 configured to decode a picture from a bitstream to obtain a decoded picture according to a specific and non-limiting embodiment.

The receiver 2000 comprises one or more processor(s) 2005, which could comprise, for example, a CPU, a GPU and/or a DSP (English acronym of Digital Signal Processor), along with internal memory 2030 (e.g. RAM, ROM and/or EPROM). The receiver 2000 comprises one or more communication interface(s) 2010 (e.g. a keyboard, a mouse, a touchpad, a webcam), each adapted to display output information and/or allow a user to enter commands and/or data (e.g. the decoded picture); and a power source 2020 which may be external to the receiver 2000. The receiver 2000 may also comprise one or more network interface(s) (not shown). The decoder module 2040 represents the module that may be included in a device to perform the decoding functions. Additionally, the decoder module 2040 may be implemented as a separate element of the receiver 2000 or may be incorporated within processor(s) 2005 as a combination of hardware and software as known to those skilled in the art.

The bitstream may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded picture may be sent to a destination, e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 2000 further comprises a computer program stored in the memory 2030. The computer program comprises instructions which, when executed by the receiver 2000, in particular by the processor 2005, enable the receiver to execute the decoding method described with reference to FIGS. 5B, 11, 12 and 13. According to a variant, the computer program is stored externally to the receiver 2000 on a non-transitory digital data support, e.g. on an external storage medium such as a HDD, CD-ROM, DVD, a read-only and/or DVD drive and/or a DVD Read/Write drive, all known in the art. The receiver 2000 thus comprises a mechanism to read the computer program. Further, the receiver 2000 could access one or more Universal Serial Bus (USB)-type storage devices (e.g., "memory sticks.") through corresponding USB ports (not shown).

According to exemplary and non-limiting embodiments, the receiver 2000 can be, but is not limited to:
- a mobile device;
- a communication device;
- a game device;
- a set top box;
- a TV set;
- a tablet (or tablet computer);
- a laptop;
- a video player, e.g. a Blu-ray player, a DVD player;
- a display; and
- a decoding chip or decoding device/apparatus.

Figure 4:
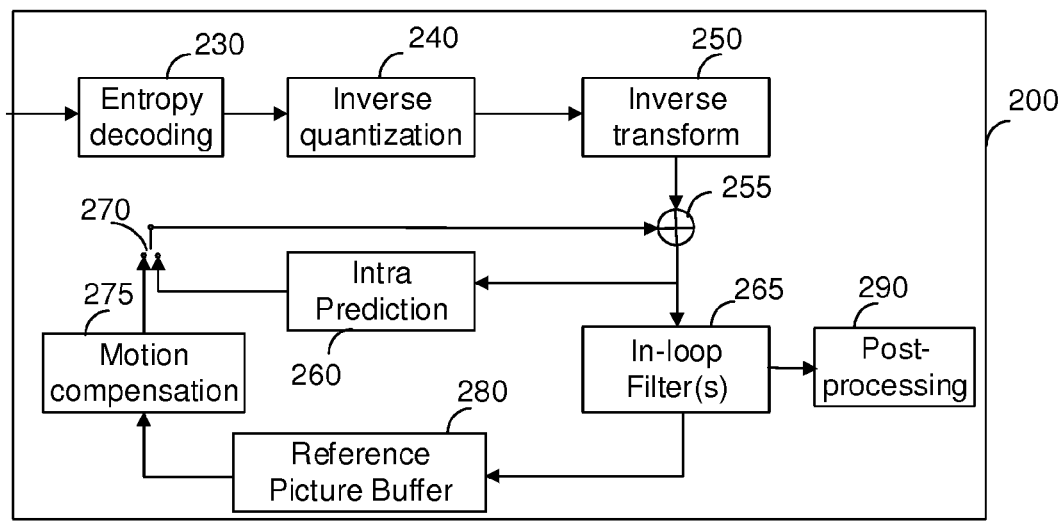
FIG. 4 illustrates a block diagram of an exemplary video decoder, e.g. an HEVC video decoder, adapted to execute the decoding method according to the present principles.

FIG. 4 illustrates a block diagram of an exemplary video decoder 200, e.g. an HEVC video decoder, adapted to execute the decoding method according to one embodiment of FIGS. 5B, 11, 12 and 13. The video decoder 200 is an example of a receiver 2000 or part of such a receiver 2000. In the exemplary decoder 200, a bitstream is decoded by the decoder elements as described below. Video decoder 200 generally performs a decoding pass reciprocal to the encoding pass as described in FIG. 2, which performs video decoding as part of encoding video data.

In particular, the input of the decoder includes a video bitstream, which may be generated by the video encoder 100. The bitstream is first entropy decoded (230) to obtain transform coefficients, motion vectors, and other coded information. The transform coefficients are de-quantized (240) and inverse transformed (250) to decode residuals. The decoded residuals are then combined (255) with a predicted sample block (also known as a predictor) to obtain a decoded/reconstructed picture block. The predicted sample block may be obtained (270) from intra prediction (260) or motion-compensated prediction (i.e., inter prediction) (275). As described above, AMVP and merge mode techniques may be used during motion compensation, which may use interpolation filters to calculate interpolated values for sub-integer samples of a reference block. An in-loop filter (265) is applied to the reconstructed picture. The in-loop filter may comprise a deblocking filter and a SAO filter. The filtered picture is stored at a reference picture buffer (280) and output for post-processing (290) before being sent to an HDR display.

FIG. 5A represents a flowchart of a method for encoding a picture block in a bitstream according to the present principles. Based on a salient analysis of the optimal codec parameters determined for various signal representations (also referred to as representation format), it is shown that optimal codec parameters can be computed from a number of pre-defined codec parameters, called default parameters, wherein the number of pre-defined codec parameters is significantly reduced compared to the number of possible signal representations. In a variant, such default parameters are further adjusted by an offset to better cope with the various representation of the signal. Thus the present principles disclose a number of pre-defined parameters, typically implemented as tables (such as dQP tables or mapping functions, or scaling functions), covering both PQ and HLG signal representations, which advantageously results in a reduction of the bit cost required to signal the predefined parameters (being for instance dQP values or mapping values, or scaling values) resulting in an improvement of the coding efficiency to code HDR signals represented either with PQ or HLG. The present principles are not limited to PQ and HLG signal representations and can be generalized for other types of signal representation, for instance, using other transfer functions, or for instance SDR signals.

The following embodiments are described for dQP, mapping, and scaling functions. However, the present principles are not limited to parameters comprising dQP, mapping, and scaling functions but can be adapted to other parameters using the same analysis approach to define a default parameter and an adjusting offset for each considered representation format.

The following embodiments are described for representation format being defined by PQ Transfer function and BT.2020 color primaries and HLG Transfer function with BT.2020/BT.2100 color primaries, P3D65 color primaries, BT.2020/BT.2100 color primaries and various peak luminance. However, the present principles are compatible with any OETF or content gamut handling HDR/WCG content, being called representation format.

The described functions may apply to one or several components of the samples of the picture. For instance, it may apply to the luma component only, or to the chroma components only, or to the luma and chroma components.

The encoding method starts at step S100. In step S110, at least one indication of a codec parameter is obtained. According to a first characteristic, an indication is representative of a default parameter value. According to a variant, a default parameter is determined for a representation format defined by PQ-1000-BT.709, respectively corresponding to a PQ transfer function, a 1000 cd/m$^2$ peak luminance, a BT.709 content gamut (ie BT.709 color primaries). In other words, a content characterized by PQ-1000-BT.709, is in a BT.2100 PQ container representation format, has a peak luminance of 1000 cd/m$^2$ and covers a color gamut BT.709 inside the BT.2100 color gamut. According to another variant, a default parameter is determined for a representation format defined by HLG-1000-P3D65, respectively corresponding to a HLG transfer function, a 1000 cd/m$^2$ peak luminance, a P3D65 content gamut. The definition of the default parameters is described with more details in the following of the description with respect to FIGS. 6, 7A, 7B, 7C, 8, 9A and 9B. According to a second characteristic, an indication is representative of an offset parameter value such that the default parameter value defined for a default representation format is adjusted for the format responsive to the offset parameter value. According to a third characteristic, the indication is representative of the signal representation of the block to encode, and the default parameter value and offset parameter value are implicitly deduced from the indication of the signal representation format, called current representation format.

In a step S120, the codec parameters for the current representation format of the picture to encode are determined responsive to default parameter value and the offset parameter value resulting from the indication. This step S120 is described for various embodiments of codec parameters in the following of the description with respect to FIGS. 11, 12 and 13.

At step S130, a transmitter 1000, e.g. such as the encoder 100, accesses a block of a picture slice.

At step S140, the transmitter determines a part of an encoded bitstream for the sample for the input value of the sample represented in the current representation format and responsive to the determined codec parameters. Encoding the block usually but not necessarily comprises pre-processing the block to map or scale samples in a representation format compatible with encoding, obtaining a predictor and residual for the block, transforming residuals into transform coefficients, quantizing the coefficients with a quantization step size QP to obtain a quantized coefficients and entropy coding the quantized coefficients in the bitstream.

The steps S130 and S140 may be repeated for each sample of the accessed block in order to obtain an encoded bitstream.

The method ends at step S150.

Figure 5B:
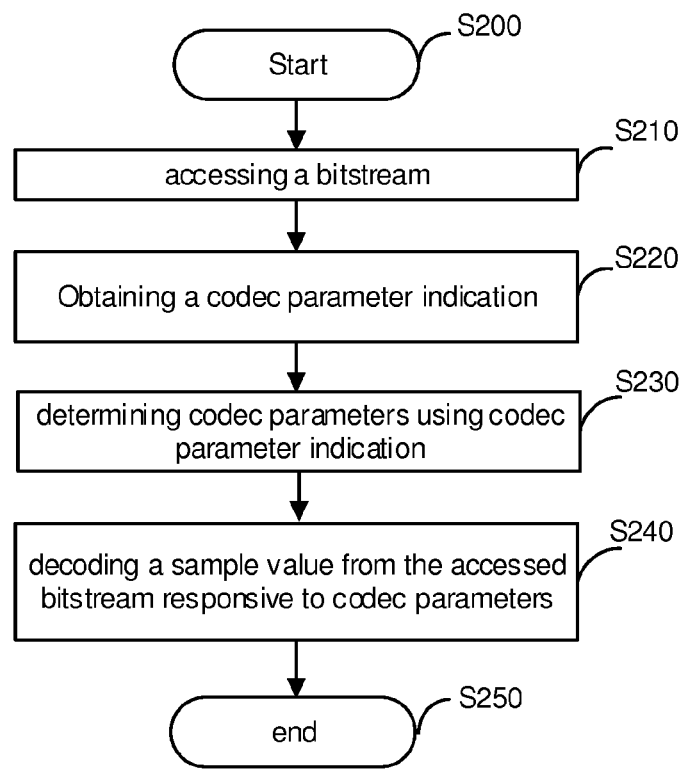
FIGS. 5B, 11, 12 and 13 represent flowcharts of a method for decoding a picture block from a bitstream according to various embodiments.

FIG. 5B represents a flowchart of a method for decoding a picture block in a bitstream that corresponding to the encoding method of FIG. 5A. A salient idea consists in normatively implementing in the decoder a number of pre-defined tables (representative of dQP values or mapping values, or scaling values), covering both PQ and HLG signal representations, which advantageously results in a reduction of the bits required to signal the parameter values (dQP values or mapping values, or scaling values) resulting in an improvement of the coding efficiency to code HDR signals represented either with PQ or HLG.

The method starts at step S200. At step S210, a receiver 2000 such as the decoder 200 accesses a bitstream.

At step S220, the receiver obtains a codec parameter indication relative to selecting and adapting decoding parameters known for a default representation format to a current representation format. According to a first characteristic, an indication representative of a default parameter is obtained. According to a second characteristic, an indication representative of an offset to apply to the default parameter is obtained. According to a third characteristic, an indication representative of current representation format is obtained. In a variant particularly adapted to first or second characteristic of the indication, the indication is explicitly decoded from the bitstream. In another variant particularly adapted to third characteristic of the indication, the indication is implicitly retrieved from the bitstream for instance using the VUI.

At step S230, the receiver determines the codec parameters from default codec parameters and optionally from the offset value.

At step S240, the receiver decodes the bitstream. Decoding usually but not necessarily comprises entropy decoding a portion of the bitstream representative of a block to obtain a block of transform coefficients, de-quantizing and inverse transforming the block of transform coefficients to obtain a block of residuals, combining residuals with a predicted sample block (also known as a predictor) to obtain a decoded/reconstructed picture block, and post-processing the decoded/reconstructed picture block for display.

The steps S230 and S240 may be repeated for each sample of the accessed block.

The method ends at step S250.

Determination of the Set of Default Parameter Tables

The analysis of optimal coding parameters is now described for 3 different embodiments of the codec parameters respectively corresponding to a local QP adaptation, to signal mapping prior to encoding, and to residual signal scaling inside the encoding process with respect to FIGS. 6, 7A, 7B, 7C, 8, 9A and 9B.

In the Technical Report ISO/IEC 23008-14 (2017), "Conversion and Coding Practices for HDR/WCG Y'CbCr 4:2:0 Video with PQ Transfer Characteristics", methods are described for improving the encoding of HDR/WCG video signals obtained with PQ. The skilled in the art of encoding/decoding video signals knows that, in an encoder the quantization is tuned using a Quantization Parameter QP. From the QP, a quantization step, Qstep0 is derived and can be approximated as $(K*2^{(QP/6)})$ where K is a fixed parameter. A first disclosed solution for improving encoding of HDR/WCG signals consists in tuning the quantization is using a local QP correction depending on luma component of the HDR/WCG video. When a local QP correction, dQP, is used, the actual quantization step, Qstep1, can be approximated as $(K*2^{((QP+dQP)/6)})$, that is $(Qstep0*2^{(dQP/6)})$. The signal is divided by the quantization step. This means that, for a given dQP, the corresponding scaling, derived from the inverse of the quantization step, applied to the signal in the quantization corresponds to $2^{(-dQP/6)}$. A typical table for a 10-bit signal applicable for HDR/WCG Y'CbCr 4:2:0 Video with PQ Transfer Characteristics is as follows in the table 1:

| Ypg range | dQP |
|---|---|
| 0 to 300 | 3 |
| 301 to 367 | 2 |
| 367 to 434 | 1 |
| 434 to 501 | 0 |
| 501 to 567 | −1 |
| 567 to 634 | −2 |
| 634 to 701 | −3 |
| 701 to 767 | −4 |
| 767 to 834 | −5 |
| 834 to 1024 | −6 |

Of course, at the decoder side, an inverse scaling applies (by inverse quantization). The dQP values are either explicitly coded in the stream (in a non-normative approach), or a dQP table can be stored in or sent to the decoder, which performs the computation of the average luma of the blocks to deduce the dQP values (normative approach) for PQ Transfer Characteristics. Obtaining a dQP table optimized for any representation format from default dQP tables is described with respect to the third embodiment of coding parameters with FIG. 13.

Figure 11:
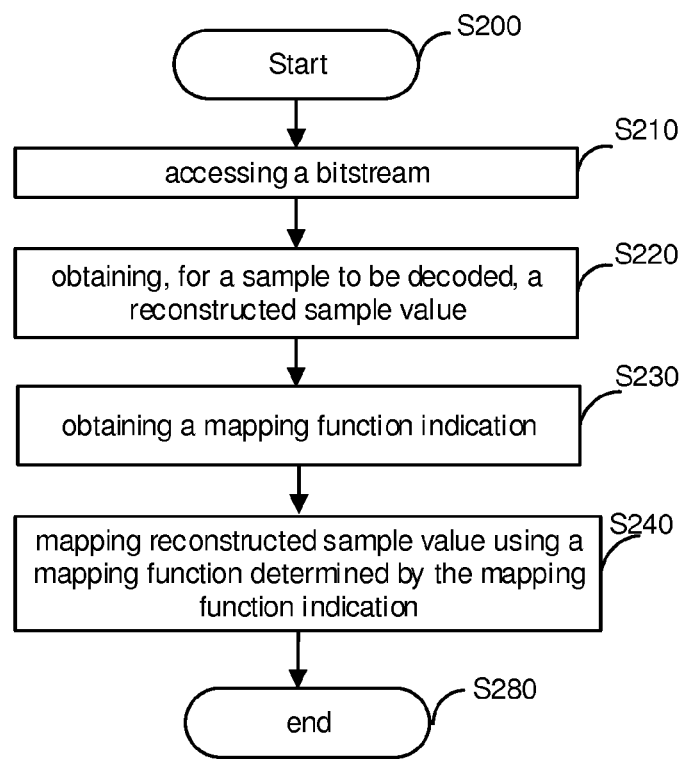
Figure 12:
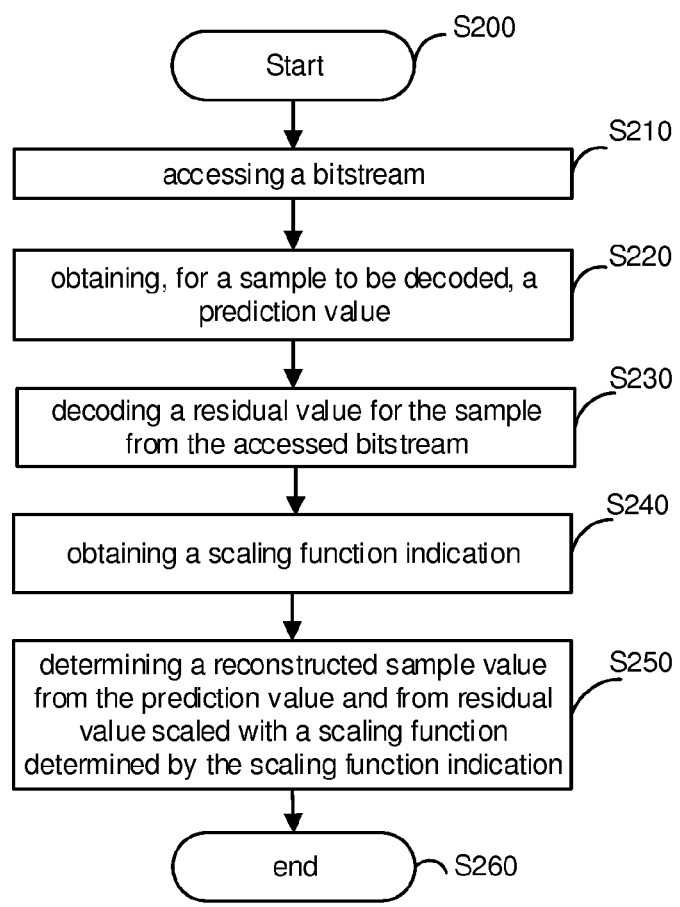

The scaling may be used on the sample as described for instance in the second embodiment of the coding parameters with FIG. 12. The scaling may also be used to derive a mapping function as in used in the first embodiment of coding parameters with FIG. 11. Thus, according to a second solution for improving encoding of HDR/WCG signals, a mapping is directly applied to the input PQ signal before the encoding, and an inverse mapping of the decoded signal after decoding is performed. Typically, a mapping function based on the dQP table above can easily be built as follows. Indeed, the scaling corresponds to the derivative of the mapping function. Therefore, the mapping function may be modeled as a piece-wise linear function where each piece has a slope equal to the scaling corresponding to this piece. If the dQP table is defined as a set of intervals $[Y_i, Y_{i+1}-1]$ with dQP value $dQP_i$ associated with each interval, for i=0 to n, n being an integer, the mapping function fmap may be defined as follows.

Let i be the index of the interval containing Y (Y is in $[Y_i, Y_{i+1}-1]$).

$$fmap(Y)=fmap(Y_i)+2^{(-dQP_i/6)}*(Y-Y_i).$$

The function fmap (respectively fscal) or its inverse function invfmap (respectively invfscal) may be either explicitly defined in decoder (and therefore in the decoder specification), or signaled in the bitstream.

Accordingly, to encode an HDR signal, in PQ format, or in HLG format, it is necessary to use as many dQP tables, or mapping tables, or scaling tables, as the types of HDR signal. For instance, it would be necessary to use one table (or function) for each one of the considered HDR format, as illustrated in the table 2 below:

| Transfer function | Peak luminance (cd/m²) | Content gamut | Table |
|---|---|---|---|
| PQ | 100 | BT.709 | Table_PQ_SDR |
| PQ | 1000 | BT.709 | Table_PQ_HDR |
| PQ | 1000 | P3D65 | |
| PQ | 1000 | BT.2020 | |
| PQ | 2000 | BT.709 | |
| PQ | 2000 | P3D65 | |
| PQ | 2000 | BT.2020 | |
| PQ | 5000 | BT.709 | |
| PQ | 5000 | P3D65 | |
| PQ | 5000 | BT.2020 | |
| PQ | ... | ... | |
| HLG | 1000 | BT.709 | Table_HLG_1000_709 |
| HLG | 1000 | P3D65 | Table_HLG_1000_P3 |
| HLG | 1000 | BT.2020 | Table_HLG_1000_2020 |
| HLG | 2000 | BT.709 | Table_HLG_2000_709 |
| HLG | 2000 | P3D65 | Table_HLG_2000_P3 |
| PQ | 2000 | BT.2020 | Table_HLG_2000_2020 |
| HLG | 5000 | BT.709 | Table_HLG_5000_709 |
| HLG | 5000 | P3D65 | Table_HLG_5000_P3 |
| HLG | 5000 | BT.2020 | Table_HLG_5000_2020 |
| HLG | ... | ... | ... |

Figure 6:
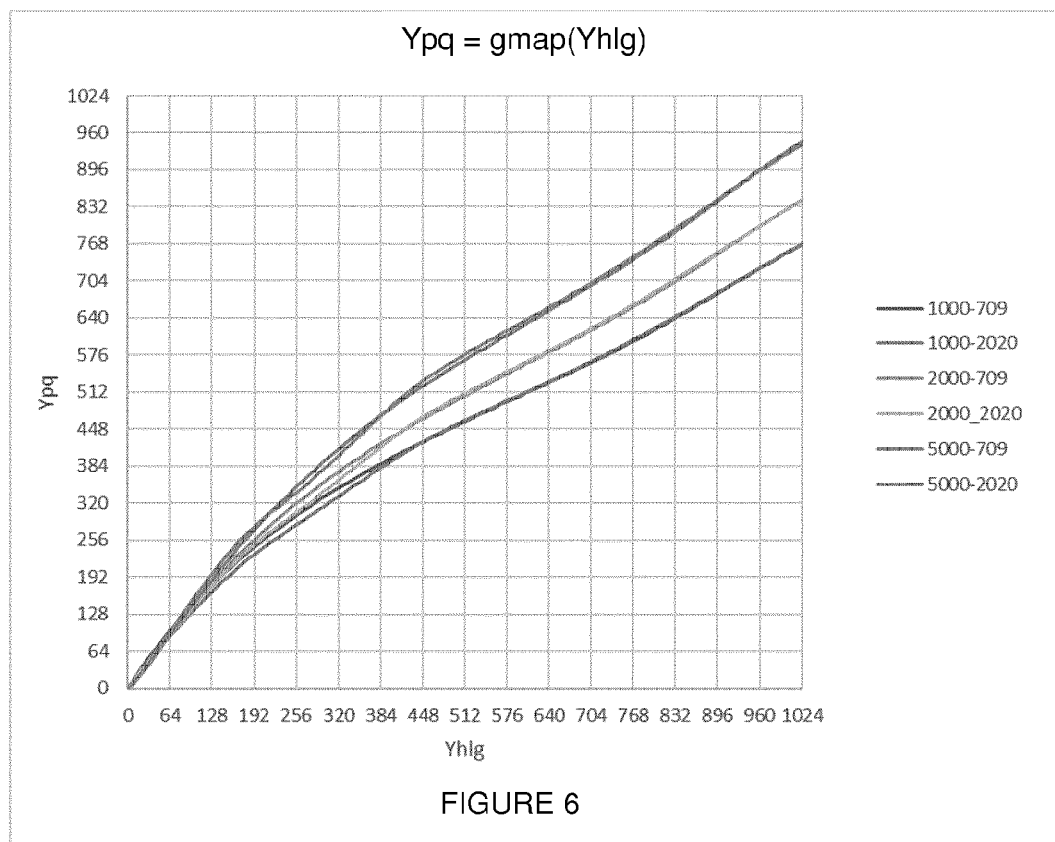
FIG. 6 illustrates various mapping function $g_{map}$ from HLG to PQ representation.

The way the tables are determined for optimal encoding of the various combination of transfer function, display peak luminance and content gamut is out of the scope of the present principles. However, for the sake of completeness, the applicant discloses such method in a patent application filed the same day by same inventors. In a nutshell, various HLG-to-PQ mapping functions Ypq=gmap(Yhlg) as shown in FIG. 6, for different peak luminance and content gamut are determined. The peak luminance of the signal is indicated in the left text of the legend (in cd/m²), while the content gamut is indicated in the right text (2020 stands for BT.2020 color primaries, 709 stands for BT. 709 color primaries). For instance, "1000-709" means peak luminance equal to 1000 cd/m², and BT.709 content gamut. The x-axis corresponds to HLG luma values, considered on 10-bits (codewords from 0 to 1023), while the y-axis corresponds to PQ luma values, considered on 10-bits (codewords from 0 to 1023). Then dQP tables or its derivative scaling function and mapping function are adapted responsive to HLG-to-PQ mapping functions. As can be seen, if for PQ case the number of tables is limited (it could even be reduced to one), for HLG, many different tables should be required depending on parameters such as the peak luminance or the content gamut. This is an issue in terms of complexity, and in terms of storage memory, and required switching. Also, signaling the current dQP values per block, or the current dQP tables into the bitstream, generates bit cost and therefore impacts the coding efficiency.

Figure 7A:
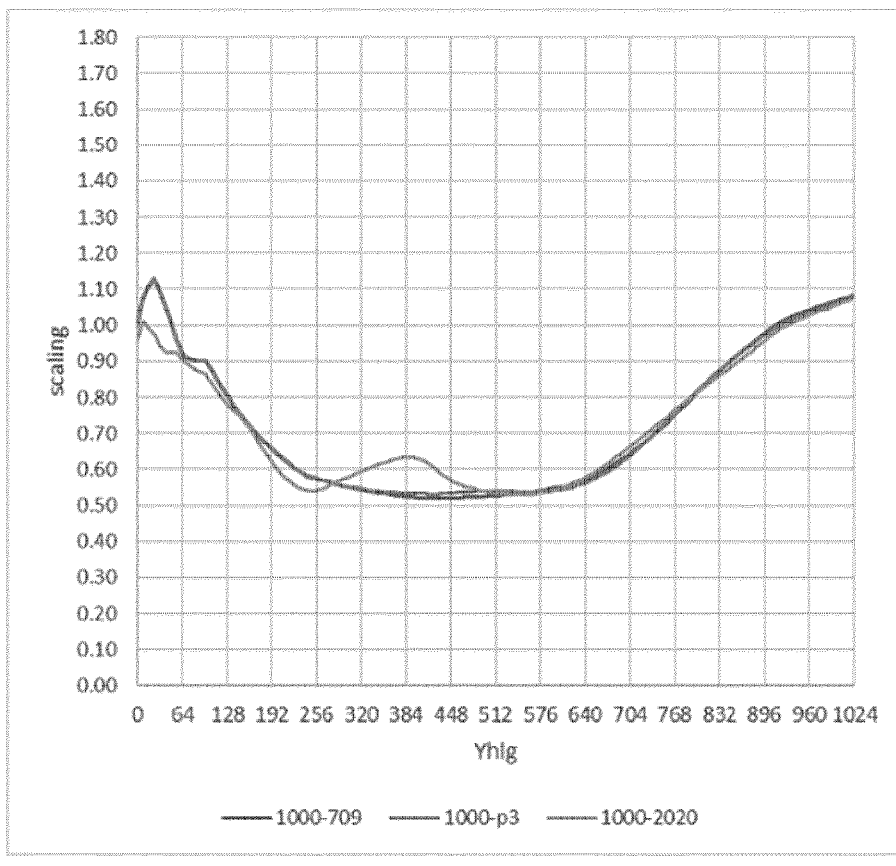
FIGS. 7A, 7B, 7C illustrate various scaling functions for different HLG representations.
Figure 7B:
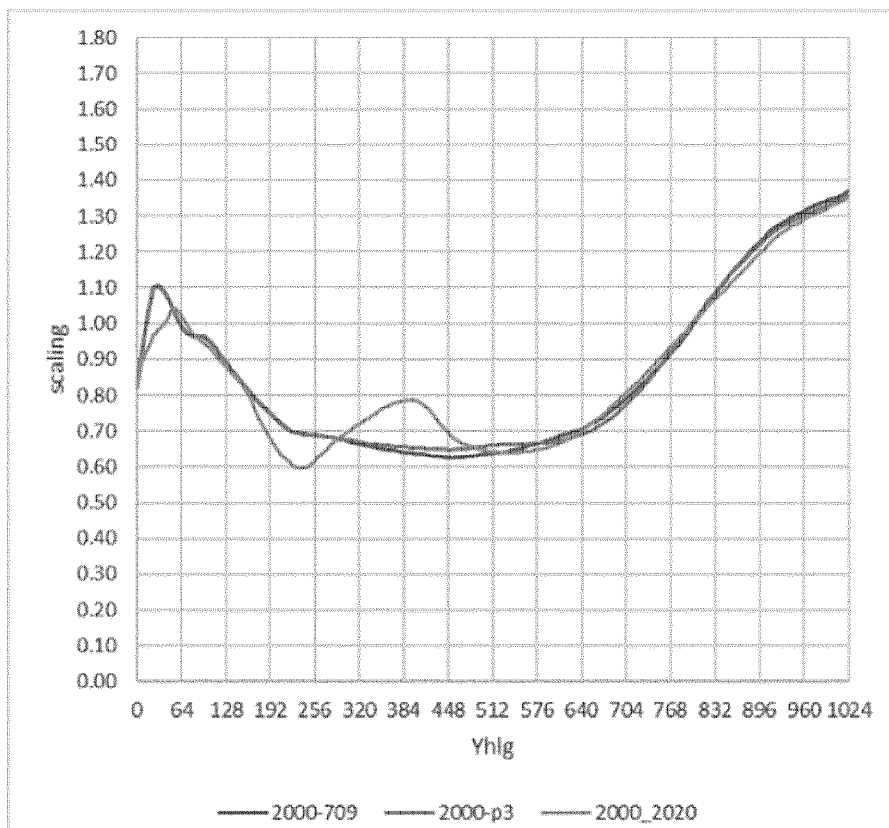
Figure 7C:
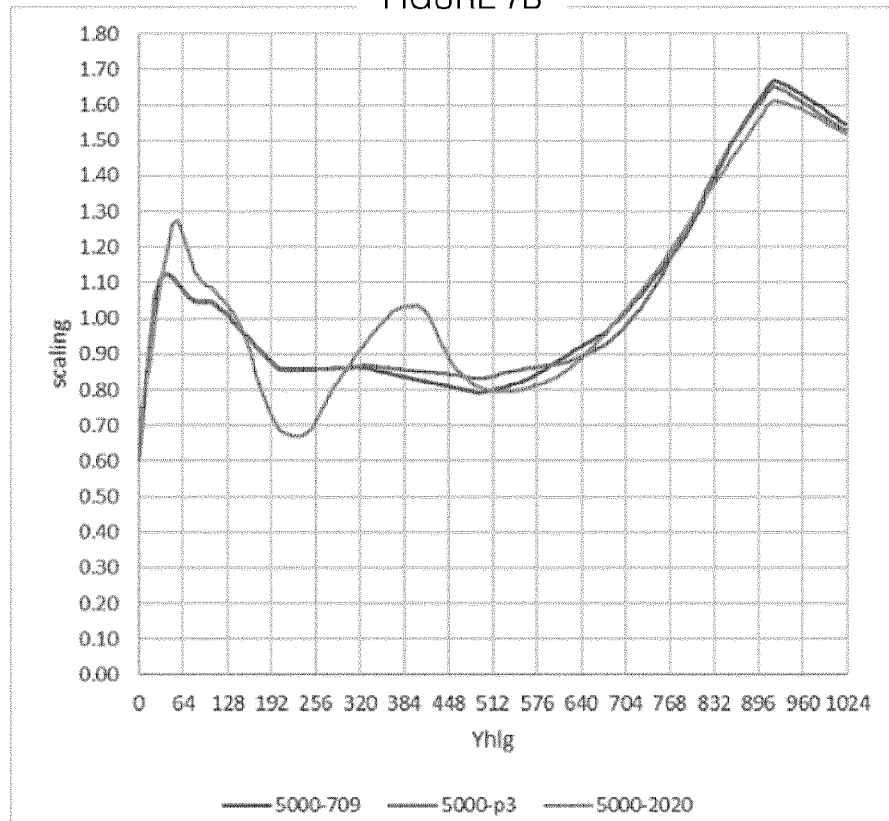

FIGS. 7A, 7B, 7C illustrate scaling functions adapted to various combination of transfer function, display peak luminance and content gamut. Such scaling functions are derived from associated HLG-to-PQ mapping functions gmap depicted in FIG. 6. Scaling functions are shown for three peak luminance values (1000, 2000, 5000 cd/m$^2$) and three content gamut (BT.709, P3D65, BT.2020).

Figure 8:
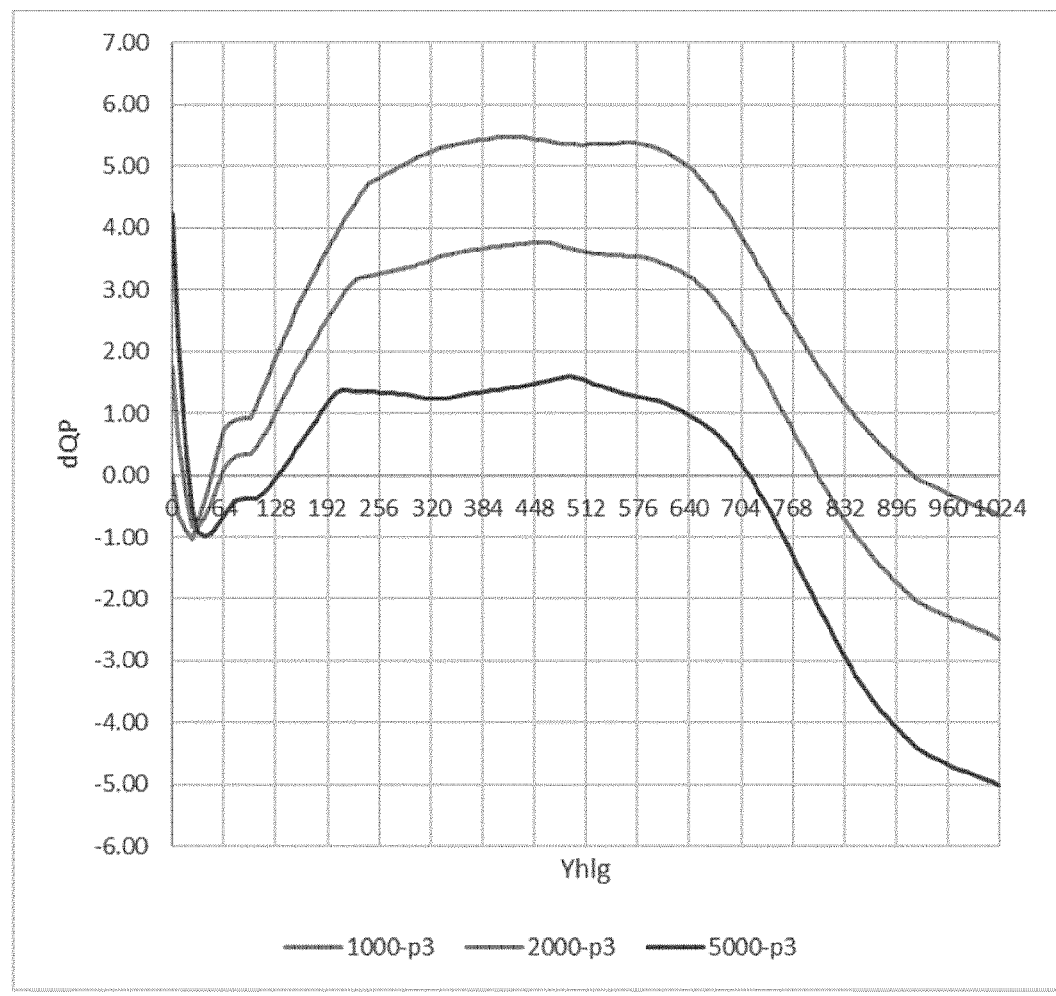
FIG. 8 illustrates various dQP functions for different HLG representations.

FIG. 8 illustrates dQP functions for the P3D65 content gamut also obtained by processing the PQ dQP function and the HLG-to-PQ mapping functions gmap depicted FIG. 6.

As shown on FIGS. 7A, 7B, 7C, the scaling (and therefore dQP) curves for P3D65 and BT.709 are very close. Such curves can be seen as an approximation (or smoothed version) of the curve BT.2020, which is an extreme case where it is considered that most of the BT.2020 content gamut is used. This situation is almost impossible, samples being over the P3D65 content gamut are expected to be rather rare. Accordingly, the P3D65 or BT.709 curves look to be good approximations of the other ones for a given peak luminance. According to a preferred embodiment, P3D65 is used to defined default parameters. In an alternative embodiment, BT.709 is used to defined default parameters.

As shown on FIG. 8, the dQP curves for P3D65 case (this is also true for BT.709 and BT.2020 cases), for different peak luminance values, have similar shapes. If one of these curves is used as reference, the other ones can be approximated by just applying a constant dQP offset to all values. Apart from the initial part of the curves (for Yhlg roughly below 200, that correspond to rather dark samples where the eye is less sensitive), the difference value with respect to the 1000 cd/m$^2$ dQP curve is around −2 for the 2000 cd/m$^2$ dQP curve, and −4 for the 5000 cd/m$^2$ dQP curve. Accordingly, one single curve could be used as default curve and the other curves are deduced by applying an offset, which actually corresponds to a global delta QP (QP offset) value typically used as an input to the encoder. According to a preferred embodiment, a peak luminance of 1000 cd/m$^2$ is used to defined default parameter.

Definition of the Default Parameter Tables

In contrast to having one specific mapping function, scaling function or dQP table, per PQ or HLG signal type (further defined by its peak luminance and content gamut), the present principles define a reduced default set of mapping functions, scaling functions or dQP tables. This is illustrated in the table 3, which, in contrast to the table 2, shows that the number of tables has been significantly reduced, with one or two tables (or functions) for PQ representation, and one or two tables (or functions) for HLG representation.

| Transfer function | Peak luminance (cd/m$^2$) | Content gamut | Table |
|---|---|---|---|
| PQ | 1000 | BT.709 | Table_PQ |
| PQ | 1000 | P3D65 | |
| PQ | 1000 | BT.2020 | |
| PQ | 2000 | BT.709 | |
| PQ | 2000 | P3D65 | |
| PQ | 2000 | BT.2020 | |
| PQ | 5000 | BT.709 | |
| PQ | 5000 | P3D65 | |
| PQ | 5000 | BT.2020 | |
| PQ | ... | ... | |
| HLG | 1000 | BT.709 | Table_HLG = HLG-1000-P3 |
| HLG | 1000 | P3D65 | |
| HLG | 1000 | BT.2020 | |
| HLG | 2000 | BT.709 | |
| HLG | 2000 | P3D65 | |
| PQ | 2000 | BT.2020 | |
| HLG | 5000 | BT.709 | |
| HLG | 5000 | P3D65 | |
| HLG | 5000 | BT.2020 | |
| HLG | ... | ... | |

A preferred embodiment of a default set is made of:

One single mapping function, scaling function or dQP table called Table_PQ defined for PQ signal;

One single mapping function, scaling function or dQP table called Table_HLG defined for HLG signal with 1000 cd/m$^2$ and P3D65 display. So, it is recommended to use the mapping function, scaling function or dQP table, defined for HLG signal with 1000 cd/m$^2$ and content gamut P3D65.

The skilled in the art will appreciate that 1000 cd/m$^2$ is defined as the nominal display peak luminance in the BT.2100 recommendation for HLG and that most content are produced on P3D65 displays, thus the default profile of HLG-1000-P3 is particularly well adapted to the available HDR content.

Figure 9A:
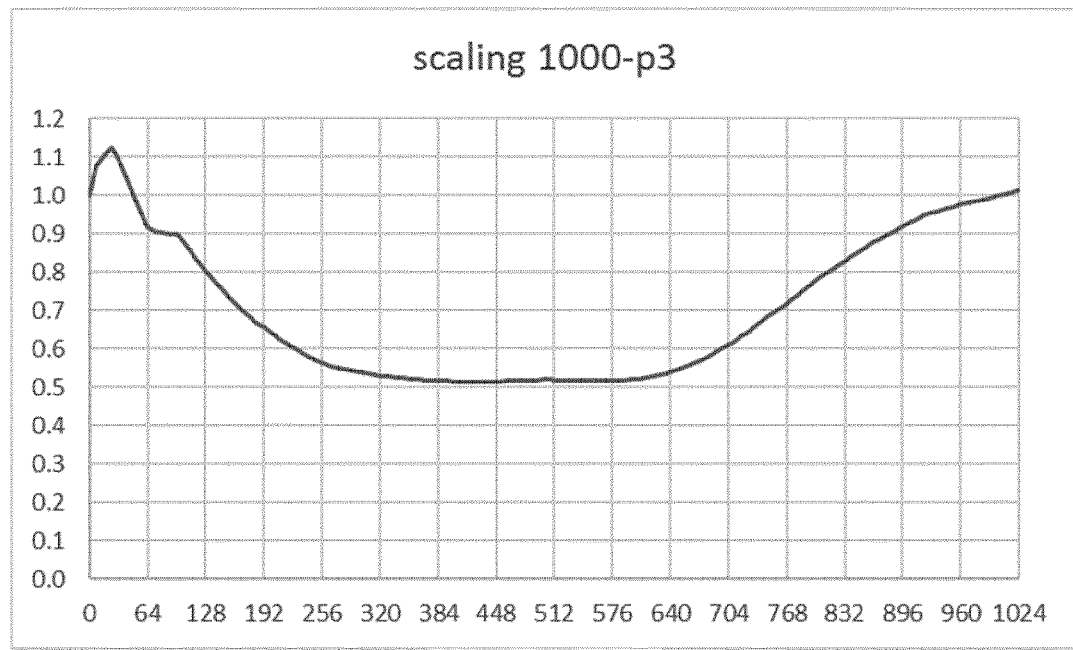
FIGS. 9A and 9B illustrate a default scaling function and a default dQP table corresponding to HLG-P3 1000 cd/m² representation according to a specific and non-limiting embodiment.
Figure 9B:
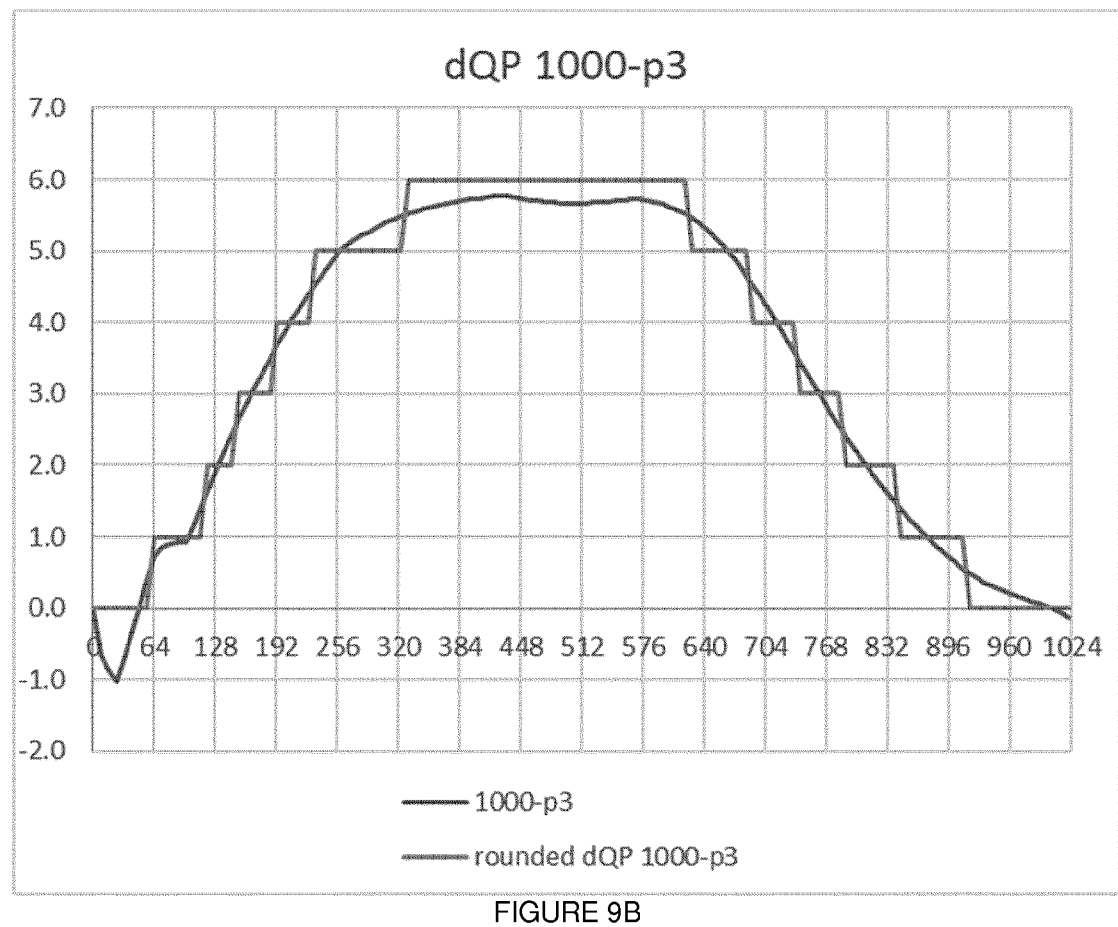
Figure 13:
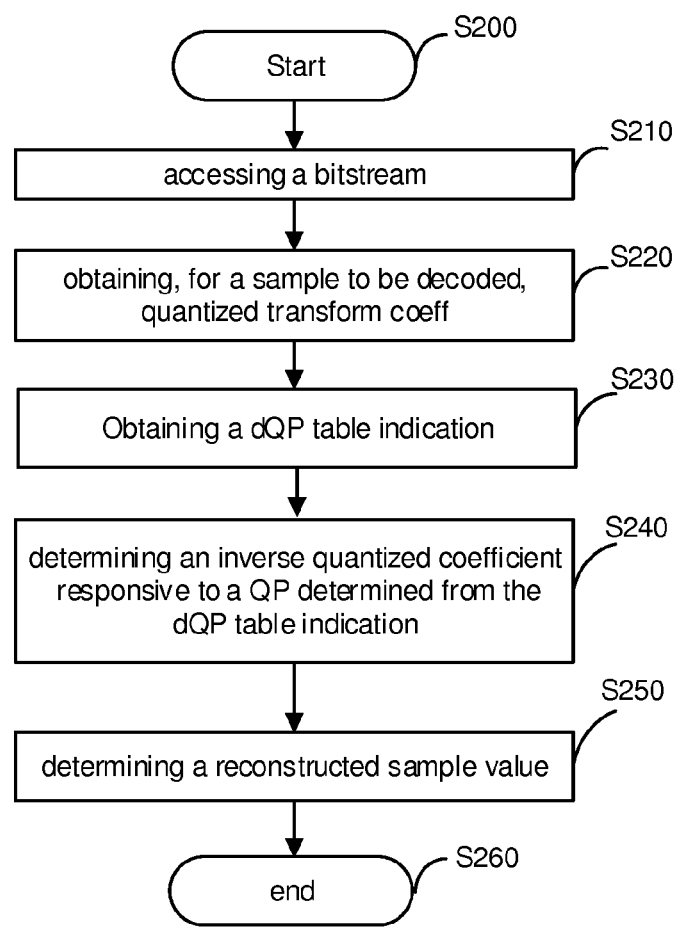

Specifically, when the dQP table is used to control the codec as latter described with FIG. 13, a single default dQP table for any HLG signal is stored in the decoder being HLG-1000-P3 table i.e. the one defined for HLG signal with 1000 cd/m$^2$ and content gamut P3D65. Besides a single default dQP table for any PQ signal is stored in the decoder being PQ-1000-P3 table. FIGS. 9A and 9B respectively represents the scaling and dQP functions for HLG-1000-P3 table. For other types of HLG signals, the adjustment can be made by tuning the slice QP offset value (for instance using the syntax element slice_qp_delta from the HEVC specification). Additional local tuning (at block level) can be applied inside the slice using the coded dQP value (for instance using the syntax elements cu_qp_delta_abs and cu_qp_delta_sign_flag from the HEVC specification). The dQP table, being a default parameter table, corresponding to the rounding of the dQP function of FIG. 9B is therefore defined as follows (possibly an offset can be applied to better center the values over the full Yhlg range) in table 4:

| Yhlg range | dQP | Centered dQP |
|---|---|---|
| 0 to 63 | 0 | −3 |
| 64 to 119 | 1 | −2 |
| 120 to 151 | 2 | −1 |
| 152 to 191 | 3 | 0 |
| 192 to 233 | 4 | 1 |
| 234 to 675 | 5 | 2 |
| 330 to 627 | 6 | 3 |
| 628 to 691 | 5 | 2 |
| 692 to 741 | 4 | 1 |
| 742 to 789 | 3 | 0 |
| 790 to 845 | 2 | −1 |
| 846 to 917 | 1 | −2 |
| 918 to 1023 | 0 | −3 |

The mapping, scaling and dQP functions (or there inverse) may be implemented in a decoder in the shape of:
- look-up-tables,
- piece-wise scalar functions (PWS),
- piece-wise linear functions (PWL),
- piece-wise polynomial functions (PWP).

According to a particular embodiment, dQP tables are described in the decoder specification by indicating for each dQP value, the initial value for which it applies. For instance, referring to table 1 and table 4, the following tables can be indicated in the decoder specification as described hereafter in table 5.

| Index = 0 (PQ) | | | | | | | | | |
|---|---|---|---|---|---|---|---|---|---|
| range | 0 | 301 | 367 | 434 | 501 | 567 | 634 | 701 | 767 | 834 |
| dQP | 3 | 2 | 1 | 0 | −1 | −2 | −3 | −4 | −5 | −6 |

| Index = 1 (HLG) | | | | | | | | | | | |
|---|---|---|---|---|---|---|---|---|---|---|---|
| range | 0 | 64 | 120 | 152 | 192 | 234 | 330 | 628 | 692 | 742 | 790 | 846 | 918 |
| dQP | −3 | −2 | −1 | 0 | 1 | 2 | 3 | 2 | 1 | 0 | −1 | −2 | −3 |

Signaling of Default Tables

Since different default tables (or functions) are possibly implemented in the decoder, a signaling or indication is required to indicate to the decoder which one is used. In the following, the embodiment of dQP tables is used. It can be straightforwardly generalized to inverse scaling functions or inverse mapping functions.

According to a particular embodiment, the signaling is defined as in table 6:

```
...
    enable_dQP_table
    if( enable_dQP_table == 1 ) {
        use_explicit_dQP_table
        if( use_explicit_dQP_table == 0 ) {
            index_dQP_table
        } else {
            explicit_dQP_table_num_val_minus2
            for( i = 0; i <=
explicit_dQP_table_num_val_minus2+1; i++ ) {
                explicit_dQP_table_range[ i ]
                explicit_dQP_table_value[ i ]
            }
        }
    }
...
```

The signaling may be coded in SEI message, in Sequence Parameter Sets (SPS), Picture Parameter Sets (PPS), in slice header, in Coding Tree Unit (CTU) syntax, per Tile, or in new structure such as Adaptation Picture Sets (APS).

Figure 10:
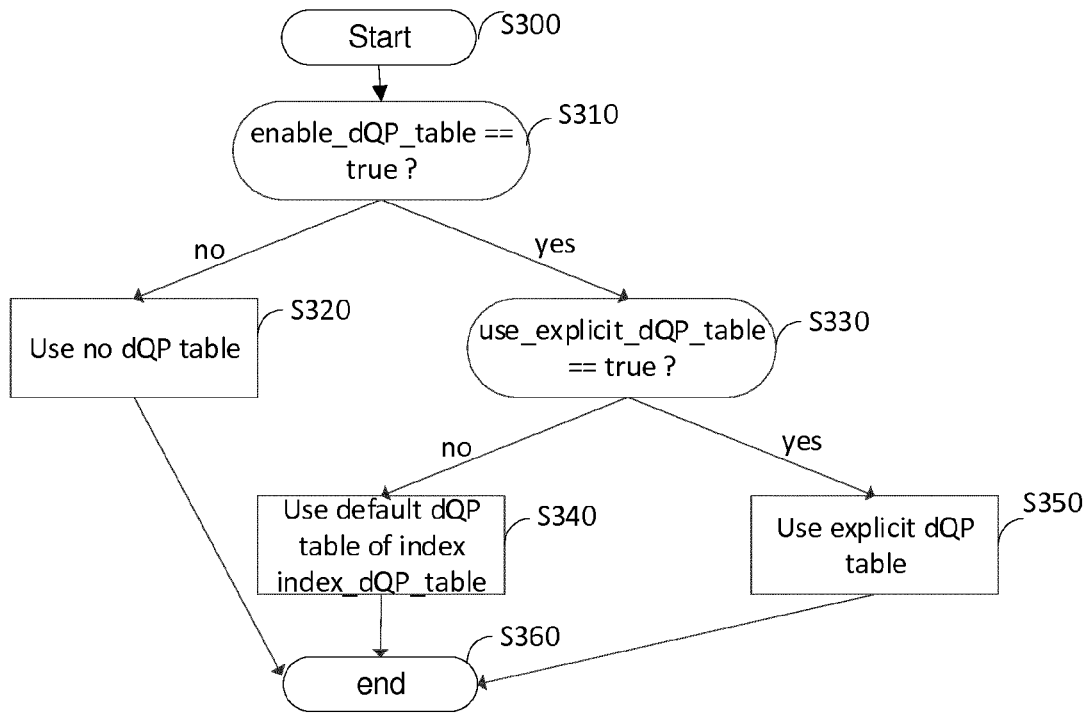
FIG. 10 represent a flowchart of a method for decoding the signaling of dQP according to a specific and non-limiting embodiment of a signaling syntax.

FIG. 10 illustrates a method for decoding signaling of dQP following the above syntax.

The method starts at step S300. At step S310, the flag enable_dQP_table is checked. If it is false, at step S320 no dQP table is used and the method ends at step S360. If it is true, at step S330 the flag use_explicit_dQP_table is checked. If it is false, at step S340 the default (pre-defined) dQP table indexed by the value index_dQP_table is used and the method ends at step S360. If it is true, in at step S350 the dQP table that is explicitly signaled in the bitstream with field explicit_dQP_table_range[i] and explicit_dQP_table_value [i] is used and the method ends at step S360.

According to another particular embodiment, the signaling of the default dQP is implicitly defined as a function of the characteristics of the signal carried in the bitstream. In a non-limiting example, the representation format is retrieved from the VUI in HEVC (the transfer function is signaled in the syntax element transfer_characteristics) and from SEI messages (the indication on peak luminance and color gamut are typically signalled in the Mastering display colour volume SEI). Information on the representation format is then used to infer the index of the default dQP table. For instance, based on the syntax of table 6, the following decoding of dQP index is processed:

if transfer_characteristics is equal to 16 (PQ), enable_dQP_table is set to 1, index_dQP_table is set to 0 if transfer_characteristics is equal to 18 (HLG), enable_dQP_table is set to 1, index_dQP_table is set to 1 otherwise enable_dQP_table is set to 0.

According to another particular embodiment, a dQP offset need to be signaled. In the case where, the default dQP table is specified for a specific HLG signal, typically for 1000 cd/m$^2$ and a color gamut P3D65, it is possible to use this table for HLG signals having other characteristics, for instance with 2000 cd/m$^2$. As described with FIG. 8, the various curves have the same shape and one is same as another one shifted by an offset. Let QPoff be this offset. This offset can be indirectly signaled by the parameters signaled in the PPS or slice header to control the initial QP value that applies to the picture. In HEVC, this is typically controlled by the syntax elements init_qp_minus26 and slice_qp_delta.

At picture level (PPS), init_qp_minus26 plus 26 specifies the initial value of SliceQpY for each slice referring to the PPS.

At slice level (slice header), slice_qp_delta enables to control the QP at slice level as follows:

SliceQpY=26+init_qp_minus26+slice_qp_delta

The encoder can therefore use the dQP table, and adjust the parameters init_qp_minus26, slice_qp_delta to reproduce the QP offset QPoff for the decoder.

Specific Embodiments of Decoding Method for dQP, Scaling and Mapping Functions

Now, 3 different embodiments of the codec parameters respectively corresponding to a local QP adaptation, to signal mapping prior to encoding, and to residual signal scaling inside the encoding process are described with FIGS. 11, 12 and 13. The described functions may apply to one or several components of the picture. For instance, it may apply to the luma component only, or to the chroma components only, or to the luma and chroma components.

FIG. 11 represents a flowchart of a method for decoding a picture block in a bitstream wherein the codec parameters are mapping functions.

The method starts at step S200. At step S210, a receiver 2000 such as the decoder 200 accesses a bitstream.

At step S220, the receiver decodes the bitstream to obtain, for a sample to be decoded, a reconstructed sample value.

At step S230, the receiver decodes the bitstream to obtain an indication of the inverse mapping function to be used as according to one embodiment of the signaling previously described.

At step S240, the receiver maps the reconstructed video using the inverse mapping function identified from the indication decoded in S230 to generate the inverse mapped video for the current representation format of the picture to decode. In this step, one of the default (pre-defined) inverse mapping functions may be activated, based on the decoded inverse mapping function indication. Considering the identified inverse mapping function finvmap(x), the inverse mapping process consists in applying the following for each sample sdec of the decoded picture, or of a component of each sample of the decoded picture (for instance the luma component): sinvmap=finvmap(sdec).

Steps S220 and S230 are processed in any order or even in a combined manner. The method ends at step S260.

FIG. 12 represents a flowchart of a method for decoding a picture block in a bitstream wherein the codec parameters are scaling functions.

The method starts at step S200. At step S210, a receiver 2000 such as the decoder 200 accesses a bitstream.

At step S220, the receiver decodes by an entropy decoder the bitstream to obtain, for a sample to be decoded, a prediction value.

At step S230, the receiver decodes by an entropy decoder the bitstream, the transform coefficients are inverse quantized and inverse transformed and the receiver obtains, for a sample to be decoded, a residual value sres.

At step S240, the receiver decodes the bitstream to obtain an indication of the inverse scaling function to be used as according to one embodiment of the signaling previously described.

At step S250, the residual value sres is inverse scaled using an inverse scaling function. In this step, one of the default (pre-defined) inverse scaling functions may be activated, based on the decoded function indication. Then prediction value spred is added to the inverse scaled residual value, and the resulting value is filtered resulting in the reconstructed sample value. Considering the identified inverse scaling function finvscal(x), the inverse scaling process consists in the following formula:

sinvscal=spred+finvscal(spred)*sres

Steps S220, S230 and S240 are processed in any order or even in a combined manner. The method ends at step S260.

According to a particular embodiment relative to the scaling function, the inverse scaling function does not apply to the residual signal, but is used to remap the decoded luma and chroma samples. This advantageously enables to use the same inverse scaling function for the luma and the chroma components. The inverse scaling function is used to build the inverse mapping function of the luma component, and to scale the chroma components. As described with the dQP tables coding the dQP function, the inverse scaling function (as a scaling function) is defined per intervals $[Y_i, Y_{i+1}-1]$, i being the number of the interval in between 0 and N−1, N being the total number of intervals. We note $invSc_i$ the inverse scaling factor for the interval i.

The inverse mapping function for the luma component Y is defined as follows, for a value Y in interval i:

finvmap(Y)=finvmap($Y_i$)+inv$Sc_i$×(Y−$Y_i$)

The mapping of the luma component is done as follows:
Yinvmap=map(Ydec) where Yinvmap is the inverse mapped version of the decoded luma value Ydec.

The chroma component (C=U or V), associated (co-located) to the luma Y, is rescaled as follows:
Cinvmap=offset+inv$Sc_i$*(Cdec−offset) where offset is typically equal to $2^{(bitdepth-1)}$ where i the interval number which Ydec belongs to.

The symmetric process is applied at the encoder side. We note $Sc_i$ the scaling factor for the interval i.

The mapping function for the luma component Y is defined as follows, for a value Y in interval i:

fmap(Y)=fmap($Y_i$)+$Sc_i$×(Y−$Y_i$)

The mapping of the luma component is done as follows:
Ymap=map(Yorig) where Ymap is the mapped version of the original luma value Yorig.

The chroma component (C=U or V), associated (co-located) to the luma Y, is rescaled as follows:
Cmap=offset+$Sc_i$*(Corig−offset) where offset is typically equal to $2^{(bitdepth-1)}$ where i the interval number which Yorig belongs to.

FIG. 13 represents a flowchart of a method for decoding a picture block in a bitstream wherein the codec parameters are dQP tables.

The method starts at step S200. At step S210, a receiver 2000 such as the decoder 200 accesses a bitstream.

At step S220, the receiver decodes by an entropy decoder the bitstream to obtain, for a sample to be decoded, quantized transform coefficients.

At step S230, the receiver decodes the bitstream to obtain an indication of the dQP table to be used as according to one embodiment of the signaling previously described.

At step S240, the quantized transform coefficients are inverse quantized using a QP responsive to dQP tables. In this step, one of the default (pre-defined) dQP tables may be activated, based on the decoded table indication.

At step 250, the resulting transform coefficients are inverse transformed, resulting in a residual value, the prediction value is computed, added to the residual value, and the resulting sample value is filtered thus resulting in the in the reconstructed sample value.

Steps S220, S230 and S240 are processed in any order or even in a combined manner. In a preferred embodiment, the determining of QP adapted to the current format applied to the luma component only. Thus default dQP tables are defined only for luma component. Accordingly, the format adapted QP is used in luma component encoding only. The method ends at step S260. Given the identified dQP table, the used dQP is derived as follows. We note prediction value of the signal spred. and the identified dQP table dQPtab[i], i being the index of the interval $[Y_i, Y_{i+1}-1]$, for which dQPtab[i] applies. The dQP value is computed as dQPtab[j] where j is the interval index which spred belongs to.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising encoding a block of a picture represented in a current representation format, wherein a representation format of the block of picture is defined by a color gamut, a transfer function and a peak luminance; and wherein said encoding of picture block further comprises
determining a quantization parameter QP responsive to said current representation format for encoding a luma color component of the picture block with respect to a dQP table and a QP offset, said dQP table being specified by an indication representative of a dQP table among a plurality of dQP tables and said QP offset being specified by an indication representative of the QP offset;
encoding said luma color component of the picture block into a bitstream using the determined quantization parameter QP.

2. The method of claim 1 further comprising encoding the indication representative of a dQP table among a plurality of dQP tables and the indication representative of the QP offset.

3. A method comprising decoding a block of a picture represented in a current representation format, wherein a representation format of the block of picture is defined by a color gamut, a transfer function and a peak luminance; and wherein said decoding of a block of a picture further comprises:
receiving a bitstream representative of a coded block of picture, an indication representative of a dQP table among a plurality of dQP tables, and an indication representative of a QP offset;
determining a quantization parameter QP responsive to said current representation format for a luma color component of the coded block, said quantization parameter QP being based on a dQP table specified by said indication representative of the dQP table and based on a QP offset specified by said indication representative of the QP offset;
decoding the luma color component of the coded block of the picture using the determined QP.

4. The method of claim 3 wherein said indication representative of a dQP table is implicitly determined from Video Usability Information VUI decoded in the bitstream.

5. The method of claim 3 wherein said indication representative of a dQP table and said indication representative of the QP offset are explicit decoded from said bitstream.

6. A device comprising at least one processor configured to encode a block of a picture represented in a current representation format, wherein a representation format of the picture block is defined by a color gamut, a transfer function and a peak luminance; and wherein said at least one processor is further configured to,
determine a quantization parameter QP responsive to said current representation format for encoding a luma color component of the picture block with respect to a dQP table and a QP offset, wherein the dQP table is specified by an indication representative of a dQP table among a plurality of dQP tables and wherein said QP offset is specified by an indication representative of the QP offset;
encode said luma color component of the picture block of into a bitstream using the determined quantization parameter QP.

7. The device of claim 6 wherein the at least one processor is further configured to encode the indication representative of a dQP table among a plurality of dQP tables and the indication representative of the QP offset.

8. The device of claim 6 wherein the at least one processor is further configured to encode the indication representative of the dQP table among a plurality of dQP tables and to encode the indication representative of the QP offset.

9. A device
comprising at least one processor configured to decode a block of a picture represented in a current representation format, wherein a representation format of the picture block is defined by a color gamut, a transfer function and a peak luminance; and wherein said at least one processor is further configured to:
receive a bitstream representative of a coded block of picture,
an indication representative of a dQP table among a plurality of dQP tables, and an indication representative of a QP offset;
determine a quantization parameter QP responsive to said current representation format for a luma color component of the coded block, said quantization parameter QP being based on the dQP table specified by said indication representative of a dQP table and based on the QP offset specified by said indication representative of a QP offset;
decode the luma color component of the coded block of the picture using the determined quantization parameter QP.

10. The device of claim 9 wherein said indication representative of a dQP table is implicitly determined from Video Usability Information VUI decoded in the bitstream.

11. The device of claim 9 wherein said indication representative of a dQP table among a plurality of dQP tables and said indication representative of the QP offset are explicit decoded from said bitstream.

* * * * *